No. 772,539. PATENTED OCT. 18, 1904.
F. A. SHIVELY.
AUTOMATIC COUPLING FOR AIR BRAKES.
APPLICATION FILED MAR. 30, 1904.
NO MODEL.

Witnesses:
H. J. Lewis
L. Boulton

Inventor:
F. A. Shively
By C. D. Lewis
Att'y.

No. 772,539. Patented October 18, 1904.

UNITED STATES PATENT OFFICE.

FRANKLIN A. SHIVELY, OF BRADDOCK, PENNSYLVANIA.

AUTOMATIC COUPLING FOR AIR-BRAKES.

SPECIFICATION forming part of Letters Patent No. 772,539, dated October 18, 1904.

Application filed March 30, 1904. Serial No. 200,750. (No model.)

*To all whom it may concern:*

Be it known that I, FRANKLIN A. SHIVELY, a citizen of the United States, residing at Braddock, in the county of Allegheny and State of Pennsylvania, have invented a new and useful Improvement in Automatic Couplings for Air-Brakes, of which improvement the following is a specification.

This invention relates to an improved automatic coupling for air-brakes; and it consists in the certain details of construction and combination of parts, as will be fully described hereinafter.

Figure 1:
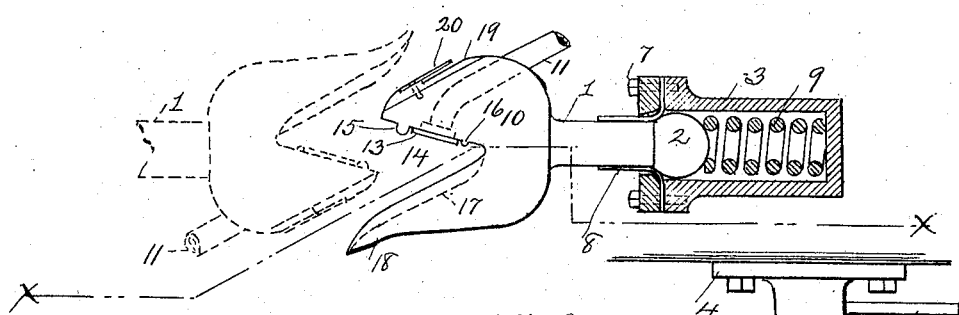
Figure 2:
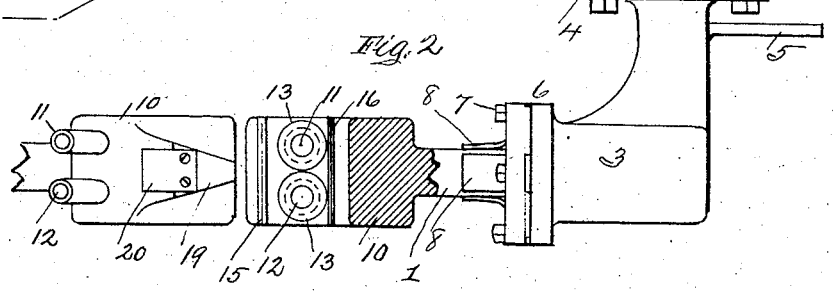
Figure 3:
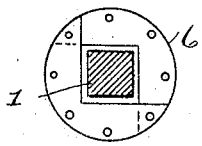
Figures 4, 5:

In the accompanying drawings, Figure 1 is a plan view of my improved automatic coupler for air-brakes, a part of which is shown in section, the said coupler being constructed and arranged in accordance with my invention. Fig. 2 is a sectional side elevation of the same, the said section being taken on the line X X of Fig. 1. Fig. 3 is an end elevation of the divided front plate of the spring-box. Fig. 4 is a face view of one of the rubber washers used in connection with the coupling. Fig. 5 is a sectional end elevation of the same.

To put my invention into practice with the air-brakes of a railway-car such as those now in common use, I provide a frame 4 of a suitable form and size and attach the same in position beneath the car-coupling and in the same vertical plane, the said frame being provided with a spring-box 3 and a removable sectional open end 6, through which the shank 1 of the coupler passes. This shank 1 is formed with an enlarged end 2, projecting into the spring-box 3, and is backed by a spring 9 and the forward end formed with a coupling-head 10. This head 10 is formed with a V-shaped vertical groove 14, one of the inner walls of which is provided with a tapering wedge-shaped groove 17, adapted to register and engage with a similar-shaped projecting portion 19, formed on the other head, and act as a guide to bring the coupling accurately in position. This wedge-shaped piece 19 is fitted with a flat spring 20, which when the coupling is made tends to press outwardly and keep the meeting faces opposite tightly together. Two air-pipes 11 and 12 enter through the heads 10, the one pipe above the other and the faces provided with soft-rubber washers 13, countersunk and protected by vertical beads 15 and 16, as will be seen by reference to Fig. 2 of the drawings. These pipes 11 and 12 are connected to the train-pipes, the one to operate the brakes and the other the engineer's signal.

In operation the couplings 10 are set right and left on opposite ends of the car and are so connected to the spring-box as will permit a side or vertical movement, the one to accommodate itself to another on separate cars, and held in a horizontal position by means of four springs 8, attached by bolts 7 to the sectional ring 6 on the spring-box 3. This coupling when made will be air-tight, the springs 9 holding the same firmly together, giving two air-passages directly through the heads 10, the wedge-shaped grooves and projections 17 and 19 interlocking and firmly holding the one washer 13 to the other.

The above-described coupler is adapted for use on passenger-trains, and when used for freight-cars it is only necessary to have one passage for air through the heads 10 and a slight modification of the frame 4 in order that the device may be properly attached in position.

This construction of an air-brake coupling will couple automatically with itself, couple with a high or low car, adjust itself to various positions to suit the curves of the track, and will uncouple when the cars are moved apart, as is obvious.

Various slight modifications and changes may be made in the details of construction without departing from the spirit of the invention. Therefore I do not wish to confine myself to the construction shown and described, but wish to claim the invention broadly.

Having thus described my invention, what I claim, and desire to secure by Letters Patent, is—

An air-brake coupling, consisting of the combination of the heads 10, each having a V-shaped vertical recess 14, a shank 1 and enlarged end 2, and suitable guides fitted with springs, registering openings formed through said heads, suitable washers 13 arranged in connection with said openings, the spring-box 3 forming a part of a suitable frame, the springs 9, to thrust the heads 10 forward, and the springs 8, to keep the heads in a central position, all arranged and combined for service substantially as and for the purpose described.

In testimony whereof I have hereunto signed my name in the presence of two subscribing witnesses.

FRANKLIN A. SHIVELY.

In presence of—
F. O. HENZI,
H. J. LEVIS.